United States Patent
Yang et al.

(10) Patent No.: US 10,841,610 B2
(45) Date of Patent: Nov. 17, 2020

(54) BLOCK SIZE DEPENDENT INTERPOLATION FILTER SELECTION AND MAPPING

(71) Applicant: Avago Technologies General IP (Singapore) Pte. Ltd., Singapore (SG)

(72) Inventors: Zhijie Yang, Irvine, CA (US); Timothy Moore Hellman, Andover, MA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 95 days.

(21) Appl. No.: 15/965,653

(22) Filed: Apr. 27, 2018

(65) Prior Publication Data

US 2019/0124359 A1   Apr. 25, 2019

Related U.S. Application Data

(60) Provisional application No. 62/576,036, filed on Oct. 23, 2017.

(51) Int. Cl.
*H04N 19/523* (2014.01)
*H04N 19/577* (2014.01)
(Continued)

(52) U.S. Cl.
CPC ......... *H04N 19/523* (2014.11); *H04N 19/117* (2014.11); *H04N 19/159* (2014.11);
(Continued)

(58) Field of Classification Search
CPC .................................................... H04N 19/523
See application file for complete search history.

(56) References Cited

U.S. PATENT DOCUMENTS 5,453,840 A * 9/1995 Parker ................. H04N 9/093
348/188
10,455,253 B1 * 10/2019 Vitvitskyy ............. H04N 19/51
(Continued)

OTHER PUBLICATIONS

K. Ugur, D. Rusanovskyy, & M. Gabbouj, "Efficient Calculation of Adaptive Interpolation Filter with Distortion Modelling", 2008 IEEE Intl Conf. on Acoustics, Speech, & Signal Processing (ICASSP) 673-767 (May 2008) (Year: 2008).*

(Continued)

*Primary Examiner* — David N Werner
(74) *Attorney, Agent, or Firm* — Morgan, Lewis & Bockius LLP

(57) ABSTRACT

A device implementing the subject video coding system may include a processor that encodes an N×M block using an x-tap filter for horizontal interpolation and a y-tap filter for vertical interpolation, where x is proportional to N and y is proportional to M. The processor may use a current block size to select an interpolation filter with a first length or a second length for a current block, use an overlapped block size to select an interpolation filter with a first length or a second length for overlapped areas, and, when a neighboring block uses a long interpolation filter and a short interpolation filter is selected for the overlapped area, maps the long interpolation filter to a short interpolation filter of a selected type. The processor may calculate a reference block size based on a scaling factor and use the reference block size to select a filter length.

16 Claims, 8 Drawing Sheets

(51) Int. Cl.
*H04N 19/82* (2014.01)
*H04N 19/587* (2014.01)
*H04N 19/159* (2014.01)
*H04N 19/80* (2014.01)
*H04N 19/176* (2014.01)
*H04N 19/117* (2014.01)

(52) U.S. Cl.
CPC ......... *H04N 19/176* (2014.11); *H04N 19/577* (2014.11); *H04N 19/587* (2014.11); *H04N 19/80* (2014.11); *H04N 19/82* (2014.11)

(56) References Cited

U.S. PATENT DOCUMENTS

| | | | | |
|---|---|---|---|---|
| 2005/0254581 | A1* | 11/2005 | Iguchi | H04N 19/533 375/240.12 |
| 2006/0050976 | A1* | 3/2006 | Molloy | H04N 19/51 382/233 |
| 2013/0128974 | A1* | 5/2013 | Chien | H04N 19/583 375/240.15 |
| 2017/0085913 | A1* | 3/2017 | Chen | H04N 19/96 |
| 2018/0098066 | A1* | 4/2018 | Lee | H04N 19/176 |
| 2018/0160138 | A1* | 6/2018 | Park | H04N 19/70 |
| 2018/0262773 | A1* | 9/2018 | Chuang | H04N 19/543 |
| 2018/0295381 | A1* | 10/2018 | Chen | H04N 19/52 |
| 2018/0376166 | A1* | 12/2018 | Chuang | H04N 19/105 |
| 2019/0191171 | A1* | 6/2019 | Ikai | H04N 19/583 |

OTHER PUBLICATIONS

G. Heising, D. Marpe, H.L. Cycon & A.P. Petukhov, "Wavelet-based very low bit-rate video coding using image warping and overlapped block motion compensation", 148 IEE Proc. 93-101 (Apr. 2001) (Year: 2001).*

* cited by examiner

BLOCK SIZE DEPENDENT INTERPOLATION FILTER SELECTION AND MAPPING

CROSS-REFERENCE TO RELATED APPLICATIONS

The present application claims the benefit of priority under 35 U.S.C. § 119 from U.S. Provisional Patent Application Ser. No. 62/576,036 entitled "VIDEO CODING," filed on Oct. 23, 2017, the disclosure of which is hereby incorporated by reference in its entirety for all purposes.

TECHNICAL FIELD

The present description relates generally to video encoding and decoding, including block size dependent interpolation filter selection and mapping.

BACKGROUND

Video coding has been widely used for variety of purposes such as compression of video for ease of transport, etc. Video coding has various areas that can be improved. For example, video coding may be improved for higher compression efficiency, higher throughput, etc.

BRIEF DESCRIPTION OF THE DRAWINGS

Certain features of the subject technology are set forth in the appended claims. However, for purpose of explanation, one or more implementations of the subject technology are set forth in the following figures.

DETAILED DESCRIPTION

Figure 1:
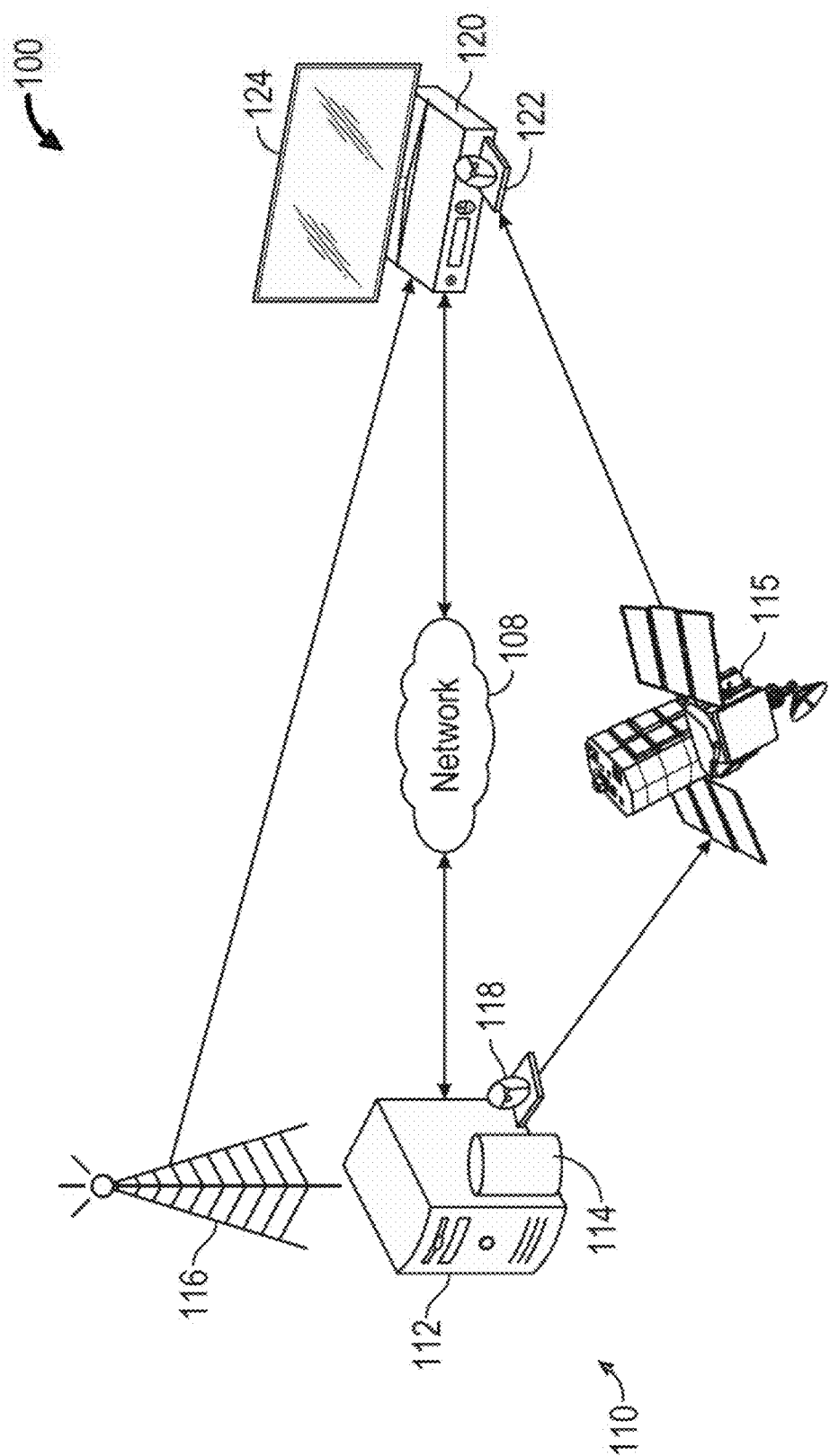
FIG. 1 illustrates an example network environment in which a video coding system may be implemented in accordance with one or more implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In motion compensation, for example, frames that are already decoded are used to predict pixels that are to be decoded since video tends not to change very much frame to frame. In the inter-prediction of blocks, such as predicting a block of an image, the encoder identifies a previous frame and fetches an amount of pixels from that previous frame. Because generally there has been some motion between the two frames, the pixels that are to be predicted exist in the previous frame but are in a slightly different place. In other words, for motion compensation, the location of the pixels as indicated by the encoder may be slightly moved from where the pixels are actually located, and thus interpolation is used to generate a prediction when the identified location has a fractional component. For example, if the location of the pixels moved by 1½ pixels, the interpolation generates the pixels that fall halfway in between integer pixel locations. In this respect, the motion compensation processes a larger section of the image and filters the section to compensate for a fractional position between two pixels.

In newer video codecs the blocks that are being fetched are getting smaller and smaller. In traditional codecs, small inter-coding blocks are encoded with interpolation filters that are relatively long. In hardware, this translates into additional memory bandwidth being consumed and additional computational capabilities being unnecessarily spent to process the additional pixels from the interpolation. Small inter prediction blocks with long interpolation filters is very inefficient in terms of memory bandwidth usage. For example, for a 4×2 inter-prediction block, 11×9 pixels would need to be fetched if 8-tap filters are used. This results in an expansion ratio of 99 to 8, or about a 1237.5 percentage increase. Using shorter interpolation filters for small blocks (e.g., 4×2) can largely reduce the memory bandwidth usage. In this respect, using 4-tap filters, for example, the minimum number of required pixels to be fetched can be reduced to 7×5 pixels for the same size block (e.g., 4×2). This results in a 64 percentage decrease compared to using 8-tap filters.

The subject disclosure provides for video coding using shorter interpolation filters for small inter-prediction blocks to reduce memory bandwidth consumption while minimizing the quality impact. In some implementations, a device implementing the subject video coding system may include a processor that encodes an N×M block using an x-tap filter for horizontal interpolation and a y-tap filter for vertical interpolation, where x is proportional to N and y is proportional to M. The processor may use a current block size to select an interpolation filter with a first length or a second length for a current block, use an overlapped block size to select an interpolation filter with a first length or a second length for overlapped areas, and, when a neighboring block uses a long interpolation filter and a short interpolation filter is selected for the overlapped area, maps the long interpolation filter to a short interpolation filter of a selected type.

The processor may calculate a reference block size based on a scaling factor and use the reference block size to select a filter length.

FIG. 1 illustrates an example network environment 100 in which a video coding system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to an electronic device 120, such as by a network 108. The CDN 110 may include, and/or may be communicably coupled to, a content server 112 for encoding and/or transmitting encoded data streams, such as HEVC (high efficiency video coding) encoded video streams, AV1 encoded video streams, and/or H.266 encoded video streams, over the network 108, an antenna 116 for transmitting encoded data streams over the air, and a satellite transmitting device 118 for transmitting encoded data streams to a satellite 115.

The electronic device 120 may include, and/or may be coupled to, a satellite receiving device 122, such as a satellite dish, that receives encoded data streams from the satellite 115. In one or more implementations, the electronic device 120 may further include an antenna for receiving encoded data streams, such as encoded video streams, over the air from the antenna 116 of the CDN 110. The content server 112 and/or the electronic device 120, may be, or may include, one or more components of the electronic system discussed below with respect to FIG. 8.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include transmission lines, such as coaxial transmission lines, fiber optic transmission lines, or generally any transmission lines, that communicatively couple the content server 112 and the electronic device 120.

The content server 112 may include, or may be coupled to, one or more processing devices, a data store 114, and/or an encoder. The one or more processing devices execute computer instructions stored in the data store 114, for example, to implement a content delivery network. The data store 114 may store the computer instructions on a non-transitory computer-readable medium. The data store 114 may further store one or more programs, e.g. video and/or audio streams, that are delivered by the CDN 110. The encoder may use a codec to encode video streams, such as an HEVC codec, an AV1 codec, an H.266 codec, or any other suitable codec. In one or more implementations, the encoder may implement one or more of the encoding techniques described in FIGS. 4-6.

For example, the encoder may encode a video stream using block size dependent filter selection for motion compensation, and/or using shorter interpolation filters for small blocks, which may largely reduce the memory bandwidth usage with minimum quality impact. In one or more implementations, the horizontal and vertical interpolation can have different filter lengths, the current block and overlapped areas can have different filter lengths, and the reference block may have a different size than the current block.

In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, such as an adaptive bit rate (ABR) server, that may be collocated with the content server 112 or may be disparately located from the content server 112.

The electronic device 120 may include, or may be coupled to, one or more processing devices, a memory, and/or a decoder, such as a hardware decoder. The electronic device 120 may be any device that is capable of decoding an encoded data stream, such as an encoded video stream.

In one or more implementations, the electronic device 120 may be, or may include all or part of, a laptop or desktop computer, a smartphone, a tablet device, a wearable electronic device, such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded video stream.

In FIG. 1, the electronic device 120 is depicted as a set-top box, e.g. a device that is coupled to, and is capable of displaying video content on, a display 124, such as a television, a monitor, or any device capable of displaying video content. In one or more implementations, the electronic device 120 may be integrated into the display 124 and/or the display 124 may be capable of outputting audio content in addition to video content. The electronic device 120 may receive streams from the CDN 110, such as encoded data streams, that include content items, such as television programs, movies, or generally any content items. The electronic device 120 may receive the encoded data streams from the CDN 110 via the antenna 116, via the network 108, and/or via the satellite 115, and decode the encoded data streams, e.g. using the hardware decoder.

Figure 2:
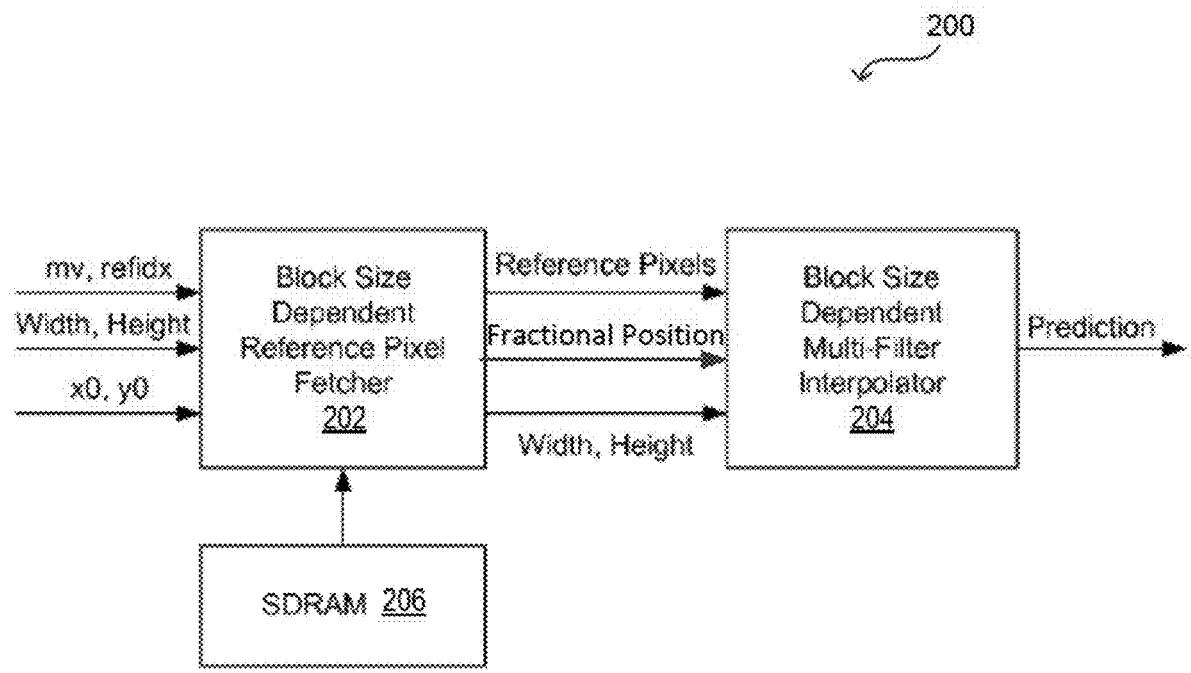
FIG. 2 illustrates a block diagram of an example of a block size dependent motion compensation engine in accordance with one or more implementations of the subject technology.

FIG. 2 illustrates a block diagram of an example of a block size dependent motion compensation engine 200 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The block size dependent motion compensation engine 200 includes a block size dependent reference pixel fetcher 202 communicatively coupled at its output to a block size dependent multi-filter interpolator 204. The pixel fetcher 202 receives at its input information that includes one or more motion vectors (MV) and associated reference picture index (refidx), a width and height of the reference block, and the spatial coordinates of the prediction block (x0, y0). The reference block position may be given by x0, y0 plus the MV. The block size dependent motion compensation engine 200 may be used for short filters for small block sizes and long filters for large block sizes. The determination of what constitutes small (large) and short (long) depends on the given implementation. For instance, in some implementations, a 6-tap filter may be considered a short filter, and any filter greater than or equal to 8 taps is considered a long filter. In some implementations, a 6-tap filter may be considered a short filter, an 8-tap filter may be considered a medium filter, and a 22-tap filter may be considered a long filter. Other variations using the same or different filter sizes may be implemented, as may be appreciated. Similarly, a small block size may be any 4×2 block size in some implementations, whereas in other implementations, a small block size may be considered to encompass 2×4, 4×4, 4×8, and 8×4. Likewise, a large block may be considered any block sizes greater than or equal to 8×8, or in some implementations, block sizes of 16×16 or greater, among other variations.

As noted above, the block size dependent motion compensation engine 200 is composed of a block size dependent reference pixel fetcher 202 and a block size dependent multi-filter interpolator 204. In some implementations, the block size dependent reference pixel fetcher 202 is configured in hardware, though some implementations of the block size dependent reference pixel fetcher 202 may be configured in software, or a combination of hardware and software. The block size dependent reference pixel fetcher 202 is configured to read reference pixels from a decoded picture buffer in memory, such as SDRAM 206. In some implementations, the block size dependent reference pixel fetcher 202 decides the filter length according to the block width and height. Then, according to the filter length and block size, the fetcher 202 fetches corresponding pixels from the SDRAM 206. For example, if the block size is 4×4, a 6-tap (short) filter may be used and the block size dependent reference pixel fetcher 202 reads (5+4)×(5+4)=81 pixels (e.g., in a 4×4 block, five (5) additional pixels for each x0, y0 coordinate). Note that the use of 81 pixels is for illustration, and that other pixel quantities and filter types may be used.

Figure 3:
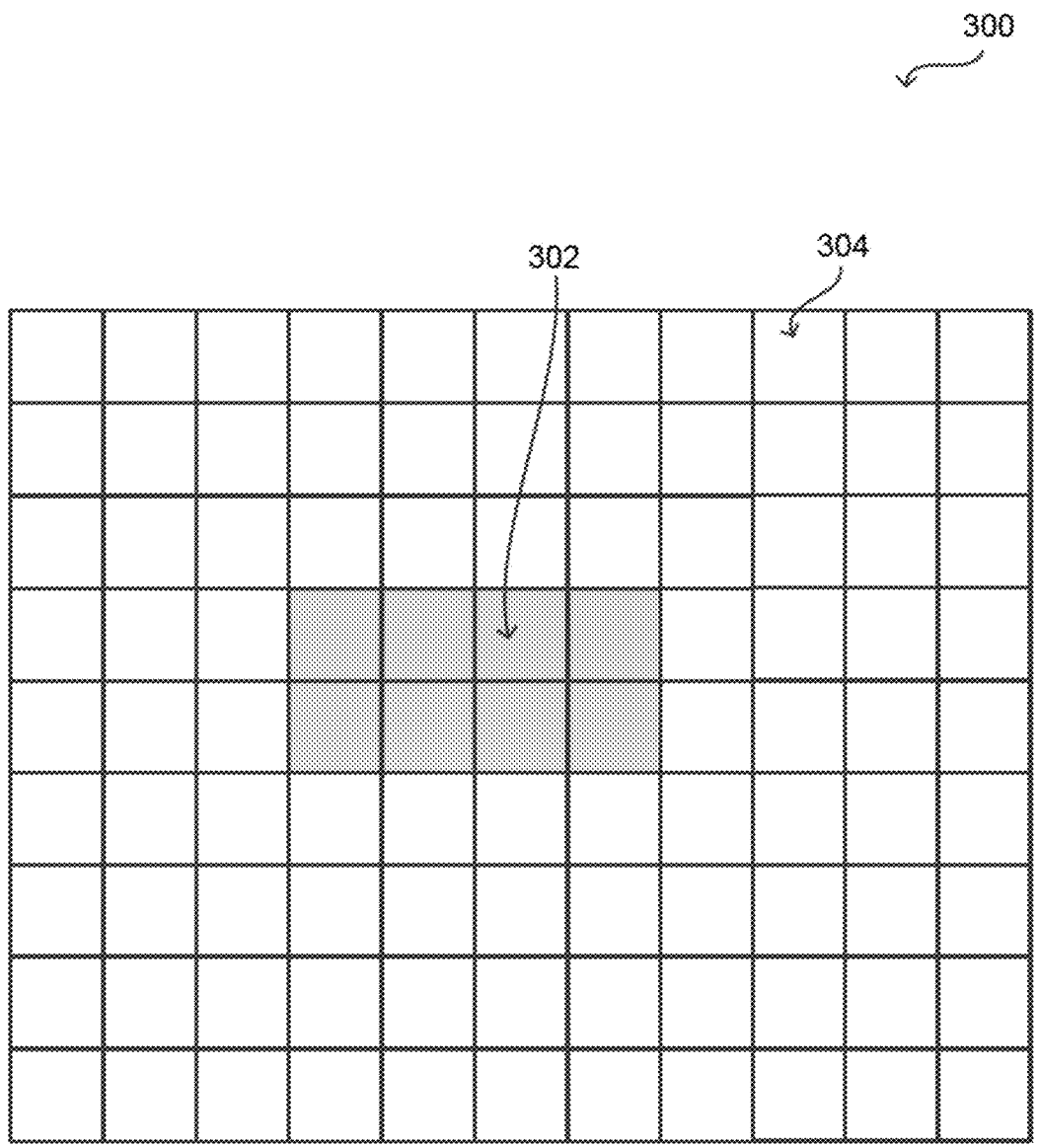
FIG. 3 conceptually illustrates an example of pixel interpolation of an inter-prediction block in accordance with one or more implementations of the subject technology.

FIG. 3 conceptually illustrates an example of pixel interpolation of an inter-prediction block 300 in accordance with one or more implementations of the subject technology. For instance, with reference to FIG. 3, reference pixels required for sub-pixel interpolation of a 4×2 inter-prediction block using an 8-tap filter is shown. The hashed pixels 302 indicate a reference 4×2 block location. The unhashed pixels 304 represent the additional locations of pixels required for 8-tap filtering. As shown, 8-tap filtering requires about 12 times more pixels (i.e., the unhashed pixels 304) than the original block (i.e., the hashed pixels 302).

Referring back to FIG. 2, the block size dependent multi-filter interpolator 204 is configured in hardware in one implementation, though in some implementations the block size dependent multi-filter interpolator 204 may be configured in software or a combination of hardware and software. The block size dependent multi-filter interpolator 204 includes a set of filters (or multiple filters), with each filter selected according to the block size. In the above example, the block size dependent multi-filter interpolator 204 includes three filters (e.g., 6-tap and 8-tap filters), and if the block size is 4×4, the 6-tap filter is used to interpolate the reference pixels to generate the prediction.

In some aspects, operation of the block size dependent reference pixel fetcher 202 and the block size dependent multi-filter interpolator 204 may be independent, in which each respective task is performed intrinsically based on a given set of conditions (e.g., block size and filter availability). Alternatively, in other aspects, operation of the block size dependent multi-filter interpolator 204 may be based on information explicitly signaled by the block size dependent reference pixel fetcher 202 or other processing logic. For instance, given a determination of the block size by the block size dependent reference pixel fetcher 202, the block size dependent reference pixel fetcher 202 may signal (e.g., via a flag) to the block size dependent multi-filter interpolator 204 the size of the block or the selected filter length (e.g., 6-tap, 8-tap, etc.) to implement. In some implementations, the block size dependent multi-filter interpolator 204 receives at its input fractional position information from the block size dependent reference pixel fetcher 202 to perform the interpolation.

Referring back to FIG. 3, small inter prediction blocks with long interpolation filters (e.g., 8-tap or larger) can be inefficient in terms of memory bandwidth usage. For example, for the 4×2 inter-prediction block (e.g., 302), 11×9 pixels would need to be fetched if 8-tap interpolation filters are used. This results in an expansion ratio of 99 to 8, or about a 1237.5 percentage increase. Using shorter interpolation filters for small blocks (e.g., 4×2) can largely reduce the memory bandwidth usage. In this respect, using 4-tap interpolation filters, for example, the minimum number of required pixels to be fetched can be reduced to 7×5 pixels for the same size block (e.g., 4×2). This results in a 64 percentage decrease compared to using 8-tap filters. Referring back to FIG. 2, in some implementations, the block size dependent reference pixel fetcher 202 may decide the filter length for each of the block width and block height. In some examples, the block size dependent reference pixel fetcher 202 may decide to select a different filter based on the block height than that selected based on the block width. For example, the block size dependent reference pixel fetcher 202 may determine that the block height does not exceed (or satisfy) a predetermined filter length threshold, and therefore, decides to select a short interpolation filter for interpolating the pixels along the vertical axis (or y-axis). In another example, the block size dependent reference pixel fetcher 202 may determine that the block width does exceed the predetermined filter length threshold, and therefore, decides to select a long filter for interpolating the pixels along the horizontal axis (or x-axis).

Figure 4:
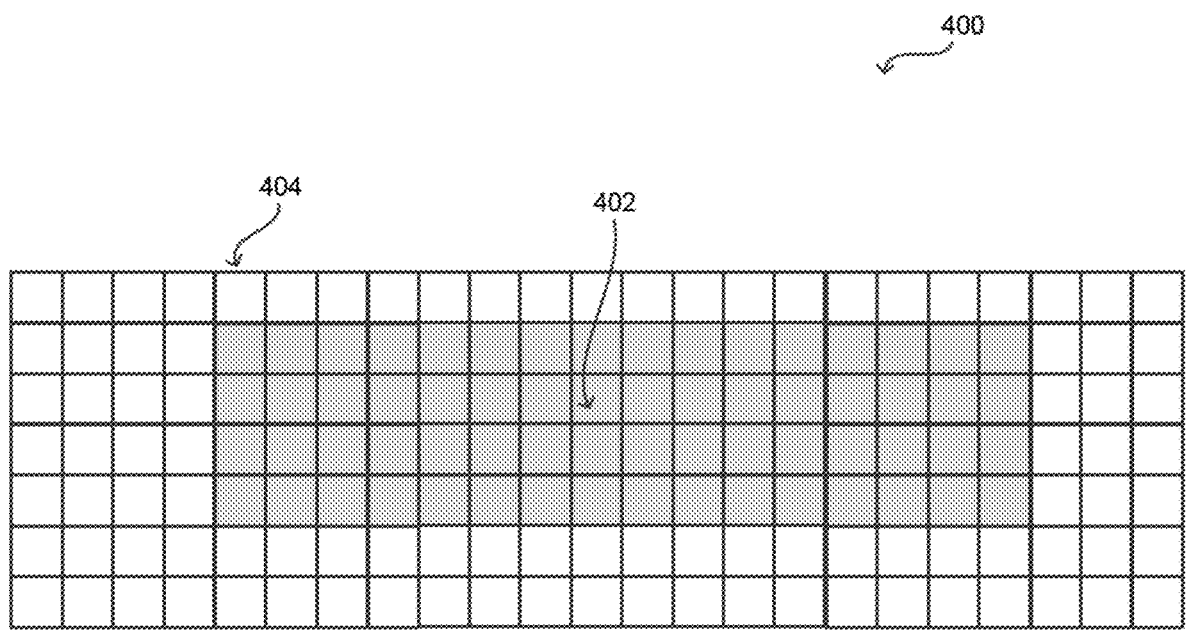
FIG. 4 conceptually illustrates an example of dual pixel interpolation of an inter-prediction block with different interpolation filters in accordance with one or more implementations of the subject technology.

FIG. 4 conceptually illustrates an example of dual pixel interpolation of an inter-prediction block 400 with different interpolation filters in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In some codecs, different interpolation filters can be used for horizontal and vertical interpolations. For instance, with reference to FIG. 4, reference pixels required for sub-pixel interpolation of a 16×4 inter-prediction block using a long interpolation filter (e.g., an 8-tap filter) along the horizontal (or x-axis) and a short interpolation filter (e.g., a 4-tap filter) along the vertical (or y-axis) are shown. The hashed pixels 402 indicate a reference 16×4 block location. The unhashed pixels 404 represent the additional locations of pixels required for interpolation filtering. As shown, 8-tap filtering for horizontal interpolation and 4-tap filtering for vertical interpolation require about 2.5 times more pixels (i.e., the unhashed pixels 404) than the original block (i.e., the hashed pixels 402). For example, the pixels of the reference block (e.g., 402) along the vertical axis (e.g., 408-1) can be extended to pixels 408-2, and the pixels of the reference block (e.g., 402) along the horizontal axis (e.g., 406-1) can be extended to pixels 406-2. In this respect, using 4-tap interpolation filters for the vertical interpolation and 8-tap interpolation filters for horizontal interpolation, for example, the minimum number of required pixels to be fetched can be about 23×7 pixels for the 16×4 reference block. This results in a 57 percentage decrease compared to using 8-tap filters for both vertical and horizontal interpolations. This also provides a better trade-off between the quality impact (i.e., coding efficiency) and memory bandwidth savings.

In operation, the block size dependent reference pixel fetcher 202 may decide the filter length for each of the block width and block height. In some examples, the block size dependent reference pixel fetcher 202 may decide to select a different filter based on the block height than that selected based on the block width. For example, the block size dependent reference pixel fetcher 202 may determine that the block height does not exceed (or satisfy) a predetermined filter length threshold, and therefore, decides to select a short interpolation filter for interpolating the pixels along the vertical axis (or y-axis). In another example, the block size dependent reference pixel fetcher 202 may determine that the block width does not exceed (or satisfy) the predetermined filter length threshold, and therefore, decides to select a short filter for interpolating the pixels along the horizontal axis (or x-axis). In some implementations, the predetermined filter length threshold may be set to a value that corresponds to the boundary between short and long filter lengths. For example, the threshold may be set to 8, such that any sizes less than 8 would use a short filter. Otherwise, sizes that correspond to or larger than 8 would use a long filter. However, the threshold may be set to an arbitrary value depending on implementation without departing from the scope of the present disclosure. In some implementations, the predetermined filter length threshold may be encoded in a data stream (e.g., bitstream), such that the block size dependent reference pixel fetcher 202 may decode the predetermined filter length threshold from the data stream and use the predetermined filter length threshold when deciding on the filter length.

Figure 5:
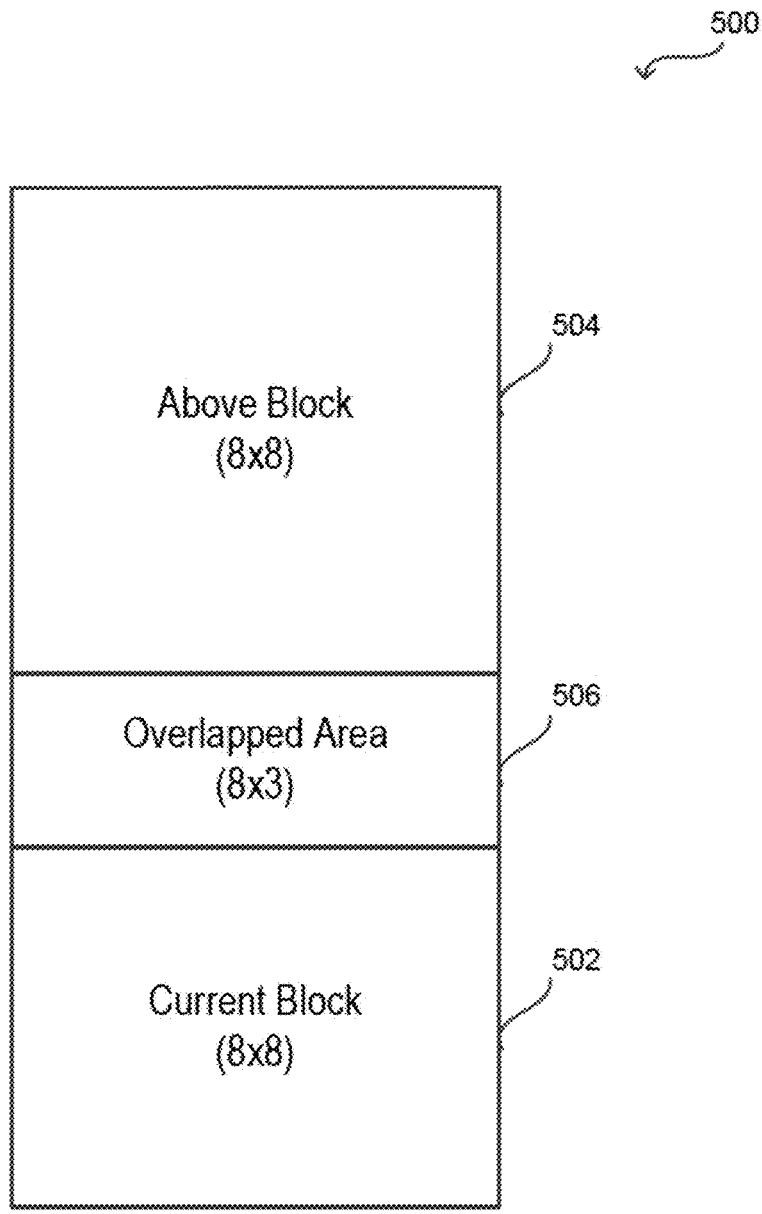
FIG. 5 conceptually illustrates an example of pixel interpolation of an inter-prediction block with different interpolation filters for overlapped block motion compensation in accordance with one or more implementations of the subject technology.

FIG. 5 conceptually illustrates an example of pixel interpolation of an inter-prediction block 500 with different interpolation filters for overlapped block motion compensation in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In some aspects, encoding specifications such as AV1 and H.266, use overlapped block motion compensation (OBMC) to improve the performance of the inter-prediction. For example, a motion vector from a neighboring block is used to generate a second prediction, and then combined with a current prediction to improve the accuracy of the inter-prediction. However, when OBMC is applied to a current block, the block size associated with the motion vector may have changed. For example, the neighboring block (relative to the current block) is a 16×16 block. However, when OBMC is being applied, the block sizes may be limited to 16×8 or 16×4, because the block size for the current block changed.

In some implementations, different filter sets are applied when OBMC is used. In some implementations, the current block size is used to select the interpolation filters for the current block (e.g., 502). In some implementations, the overlapped block size is used to select the interpolation filters for the overlapped areas (e.g., 506). In some implementations, like the dual interpolation technique as described in FIG. 4, the short filter is selected for the overlapped area because the block height along the y-axis is determined not to exceed the predetermined filter length threshold (e.g., not exceeding a length of 8). For example, if the block height of the overlapped area (e.g., 506) is less than 4 pixels (e.g., threshold), then the short filter is selected and applied to the overlapped area.

In some implementations, if the neighboring block (e.g., 504) uses long interpolation filters but the overlapped block uses short filters, the long filters are then mapped to short filters. In this respect, when shorter interpolation filter techniques are applied, the original interpolation filter needs to be mapped to the current interpolation filter using the overlapped region size. For example, the current block size is 8×8, the above block size is also 8×8, and the overlapped area (e.g., 506) is 8×3. In the above block (e.g., 504), the original interpolation filter is a long interpolation filter (given the long block size), which is then mapped to a shorter interpolation filter. In this respect, the short filter is applied to the 8×3 overlapped area (e.g., 506) even if the above block (e.g., 504) uses long filters.

In some aspects, there is a set of filters of a first type (e.g., long) and a set of filters of a second type (e.g., short), and there may be a rule for selecting and mapping a first interpolation filter type to a second interpolation filter type. For example, sharp and regular 8-tap filters (or regular long filters) are mapped to regular 4-tap filters (or regular short filters). In another example, smooth 8-tap filters (or smooth long filters) are mapped to smooth 4-tap filters (or smooth short filters). In some aspects, the long interpolation filter may have more filter types than the short interpolation filter types. In some implementations, the data stream (e.g., bitstream) may be encoded with an indication that OBMC is being applied such that the block size dependent reference pixel fetcher 202 may decode the OBMC indication from the data stream and apply different filter lengths when OBMC is used. In other implementations, the mapping between the different filter sets may be stored to and accessible from a lookup table (or database). In this example, the original interpolation filter type may be used to index the corresponding (or mapped) interpolation filter type.

Figure 6:
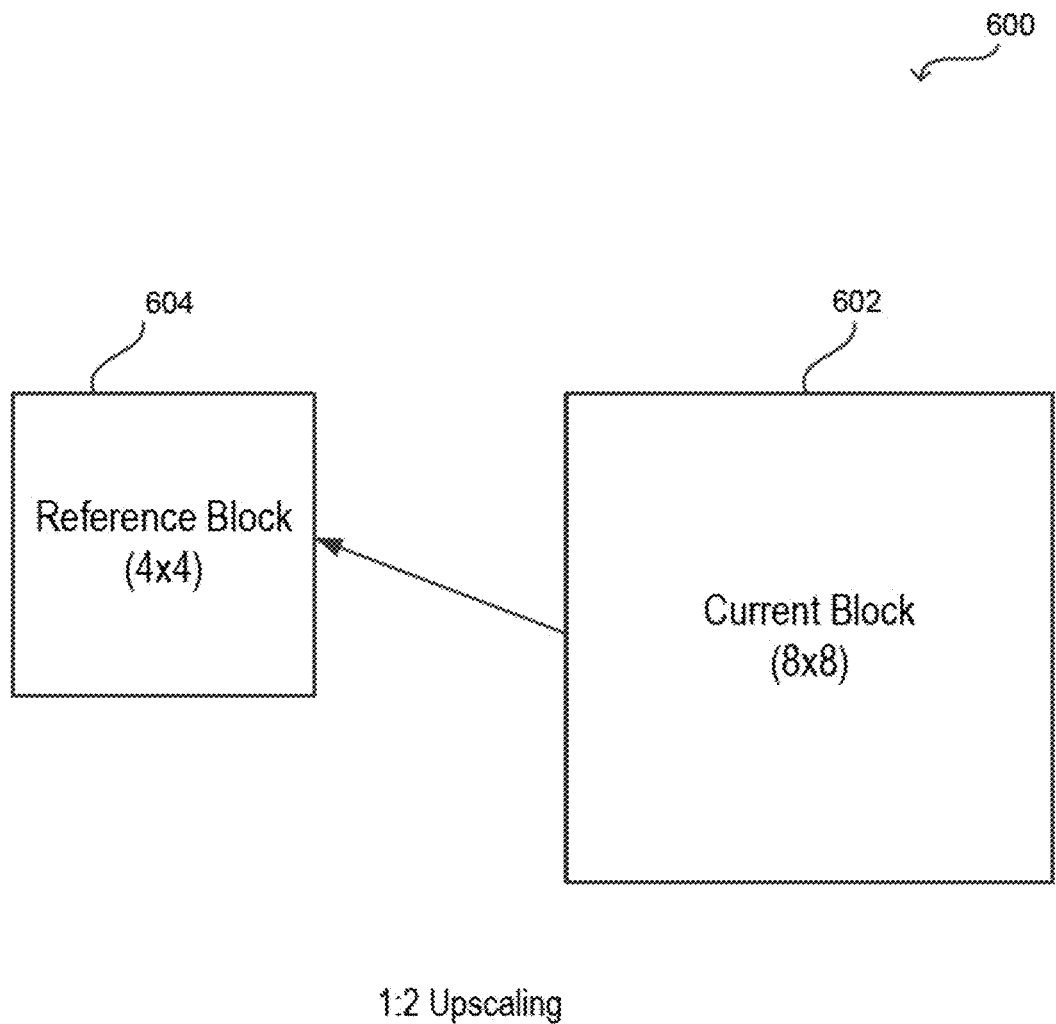
FIG. 6 conceptually illustrates an example of pixel interpolation of an inter-prediction block with different interpolation filters using reference frame scaling in accordance with one or more implementations of the subject technology.

FIG. 6 conceptually illustrates an example of pixel interpolation of an inter-prediction block 600 with different interpolation filters using reference frame scaling in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In some aspects, the encoding specifications such as AV1, use reference scaling to allow inter prediction from pictures of different sizes. In FIG. 6, the filter size is changed based on a reference block (e.g., 604) rather than a current block (e.g., 602). When a current picture and a reference picture have different sizes, reference scaling can be performed. As shown in FIG. 6, the reference block size (e.g., 4×4) is different from the current block size (e.g., 8×8). The size of the reference block (e.g., 604) can be used to decide whether a long filter or a short filter should be applied. As previously discussed in reference to FIG. 4 (e.g., dual interpolation filters) and FIG. 5 (e.g., OBMC), the reference block size is the same as the current block size. In this example, the reference block size can be larger or smaller than the current block size. In this respect, the reference block size is calculated based on a mathematical expression as specified in the related encoding specifications. For example, the reference block size may be first calculated based on a predetermined scaling factor.

In one example, the reference block width may be determined according to Equation (1):

$$\text{ref\_block\_width}=((x\text{Frac0}+(\text{curr\_block\_width}-1)*x\text{Step})>>4)+1 \quad \text{Eq. (1)}$$

In one example, the reference block height may be determined according to Equation (2):

$$\text{ref\_block\_width}=((y\text{Frac0}+(\text{curr\_block\_height}-1)*y\text{Step})>>4)+1 \quad \text{Eq. (2)}$$

Once the reference block size is known, the reference block size is used to select the interpolation filter. In some implementations, like the dual interpolation technique as described in FIG. 4, the short filter is selected for the current block because the block height of the reference block 604 along the y-axis is determined not to exceed the predetermined filter length threshold (e.g., not exceeding a length of 4). For example, if the block height of the reference block (e.g., 604) is less than 8 pixels (e.g., predetermined filter length threshold) and the block width exceeded the threshold, then the short filter is selected and applied to the vertical interpolation and the long interpolation filter is selected and applied to the horizontal interpolation.

Figure 7:
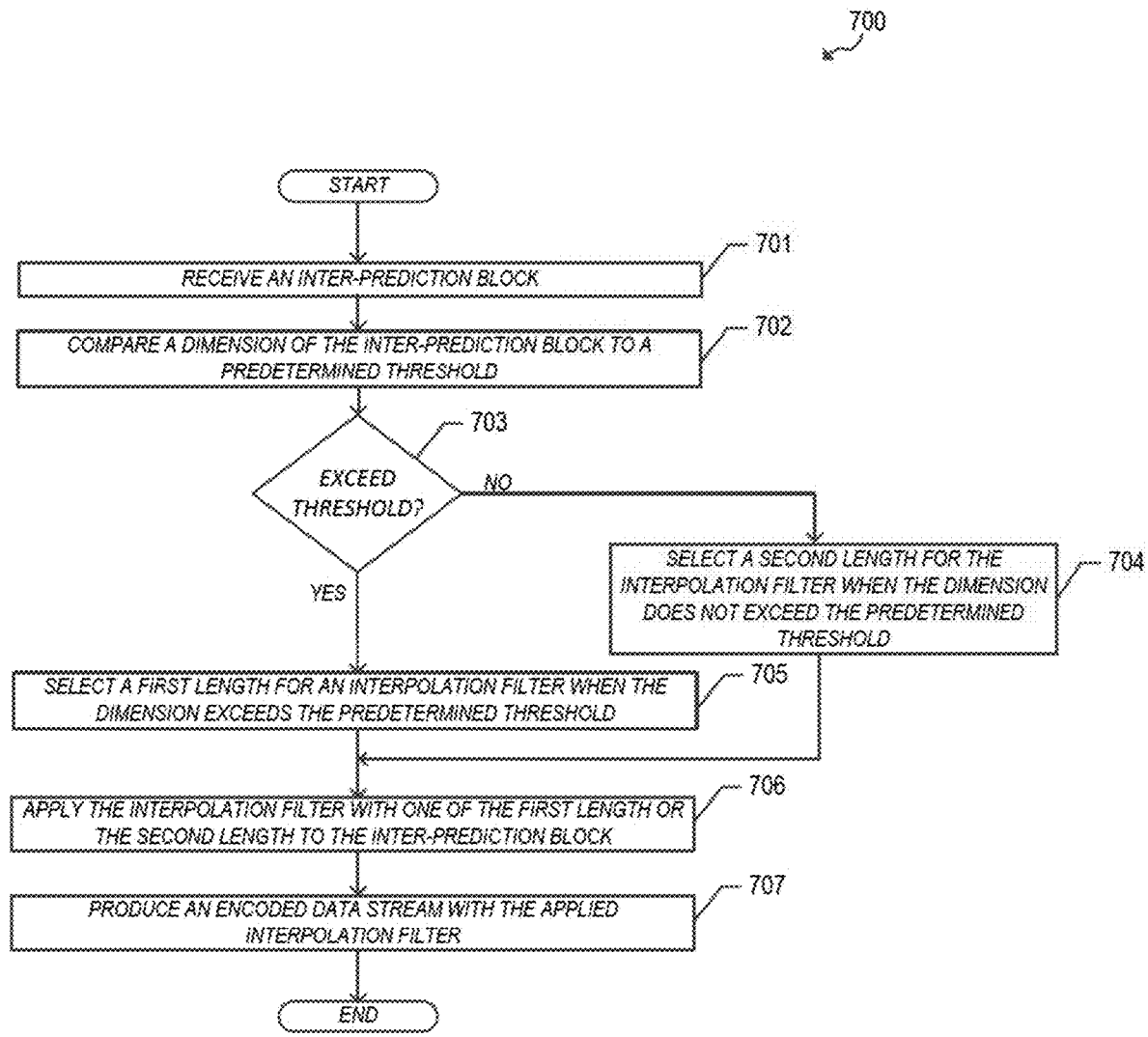
FIG. 7 illustrates a flow chart of an example process for block size dependent interpolation filter selection and mapping in accordance with one or more implementations of the subject technology.

FIG. 7 illustrates a flow chart of an example process 700 for block size dependent interpolation filter selection and mapping in accordance with one or more implementations of the subject technology. Further for explanatory purposes, the blocks of the sequential process 700 are described herein as occurring in serial, or linearly. However, multiple blocks of the process 700 may occur in parallel. In addition, the blocks of the process 700 need not be performed in the order shown and/or one or more of the blocks of the process 700 need not be performed.

The process 700 starts at step 701, where an inter-prediction block is received. Next, at step 702, a dimension of the inter-prediction block is compared to a predetermined threshold. If the dimension is determined to exceed the predetermined threshold, the process 700 proceeds to step 705. Otherwise, the process 700 proceeds to step 704. Subsequently, at step 705, a first length for an interpolation filter is selected when the dimension was determined to exceed the predetermined threshold. In some examples, the interpolation filter with the first length is a long interpolation filter. Next, at step 704, a second length for the interpolation filter is selected when the dimension was determined not to exceed the predetermined threshold. Subsequently, at step 706, the interpolation filter with one of the first length or the second length is applied to the inter-prediction block. Next, at step 707, an encoded data stream is produced with the applied interpolation filter.

Figure 8:
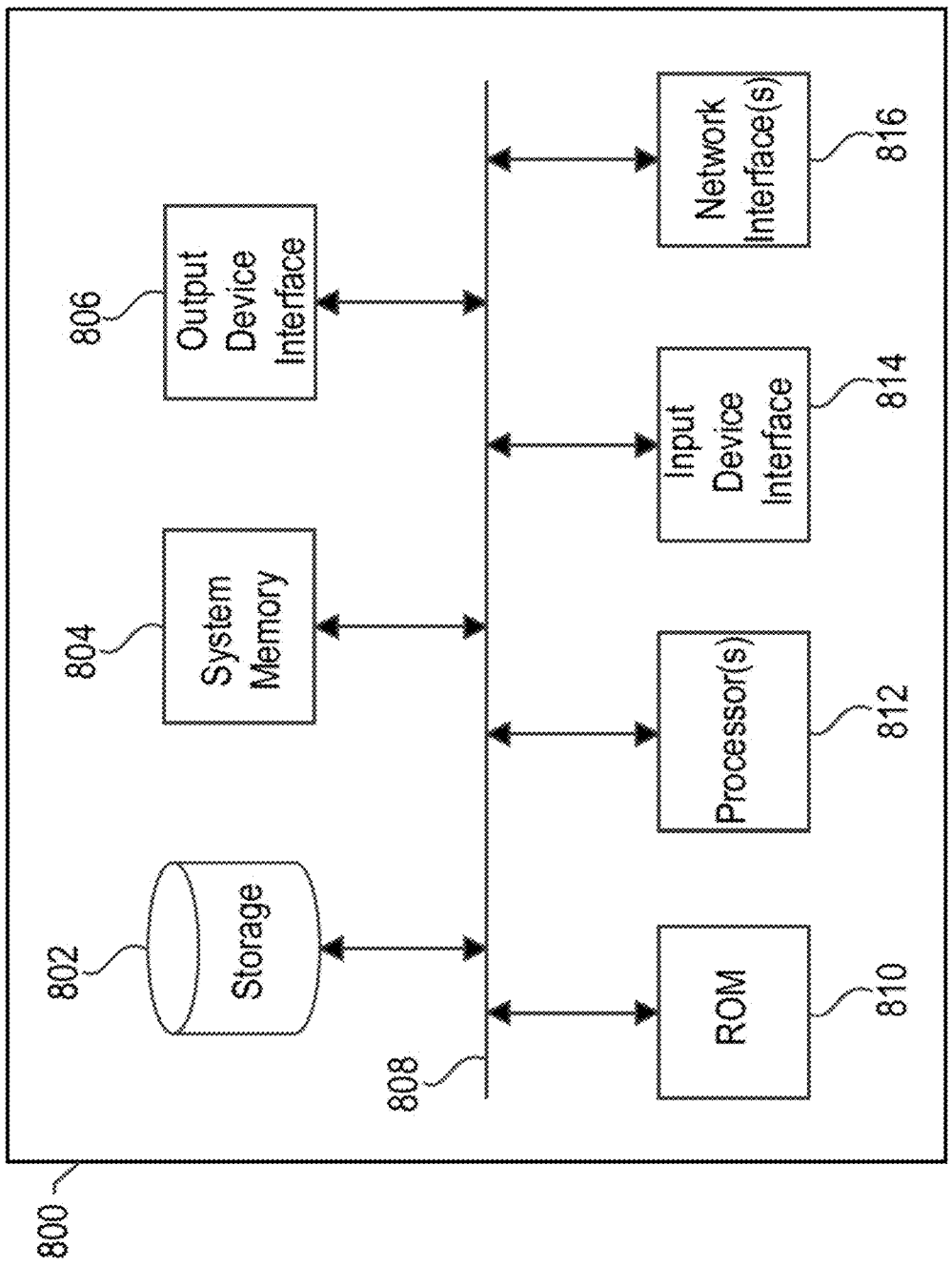
FIG. 8 conceptually illustrates an electronic system with which any implementations of the subject technology are implemented.

FIG. 8 conceptually illustrates an electronic system 800 with which one or more implementations of the subject technology may be implemented. The electronic system 800, for example, can be a network device, a media converter, a desktop computer, a laptop computer, a tablet computer, a server, a smartphone, or generally any electronic device that encodes and/or decodes video and/or audio streams. Such an electronic system 800 includes various types of computer readable media and interfaces for various other types of computer readable media. The electronic system 800 includes a bus 808, one or more processing unit(s) 812, a system memory 804, a read-only memory (ROM) 810, a permanent storage device 802, an input device interface 814, an output device interface 806, and a network interface 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system. The permanent storage device 802, on the other hand, is a read-and-write memory device. The permanent storage device 802 is a non-volatile memory unit that stores instructions and data even when the electronic system 800 is off. One or more implementations of the subject disclosure use a mass storage device (such as a magnetic or optical disk and its corresponding disk drive) as the permanent storage device 802.

Other implementations use a removable storage device (such as a floppy disk, flash drive, and its corresponding disk drive) as the permanent storage device 802. Like the permanent storage device 802, the system memory 804 is a read-and-write memory device. However, unlike the permanent storage device 802, the system memory 804 is a volatile read and-write memory, such as random access memory. System memory 804 stores any of the instructions and data that the one or more processing unit(s) 812 needs at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input device interface 814 and the output device interface 806. The input device interface 814 enables a user to communicate information and select commands to the electronic system. Input devices used with the input device interface 814 include, for example, alphanumeric keyboards and pointing devices (also called "cursor control devices"). The output device interface 806 enables, for example, the display of images generated by the electronic system 800. Output devices used with the output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks (not shown) through one or more network interfaces 816. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 800 can be used in conjunction with the subject disclosure. Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    a fetching device configured to:
        determine whether a first dimension of a current block satisfies a predetermined threshold;
        select a first length for an interpolation filter when the first dimension satisfies the predetermined threshold; and
        select a second length for the interpolation filter when the first dimension does not satisfy the predetermined threshold, the second length being different from the first length; and
    an interpolator configured to apply the interpolation filter with the selected length to the current block,
    wherein the fetching device is configured to:
        use a block size of an overlapped block interposed between a neighboring block and the current block to select another interpolation filter with one of the first length or the second length for the overlapped block; and
        when the neighboring block uses a long interpolation filter and a short interpolation filter is selected for the overlapped block, map the long interpolation filter to the short interpolation filter of a selected type, and
    wherein the interpolation filter with the first length corresponds to the long interpolation filter and the interpolation filter with the second length corresponds to the short interpolation filter.

2. The device of claim 1, wherein the interpolator is configured to apply the interpolation filter with one of the first length or the second length to pixels of the current block along a first axis that corresponds to the first dimension.

3. The device of claim 2, wherein the fetching device is configured to:
    determine whether a second dimension of the current block satisfies the predetermined threshold;
    select the first length for the interpolation filter when the second dimension satisfies the predetermined threshold; and
    select the second length for the interpolation filter when the second dimension does not satisfy the predetermined threshold.

4. The device of claim 3, wherein the interpolator is configured to apply the interpolation filter with one of the first length or the second length to pixels of the current block along a second axis orthogonal to the first axis that corresponds to the second dimension.

5. The device of claim 3, wherein the interpolator is configured to:
    encode the current block using an x-tap filter for horizontal interpolation and a y-tap filter for vertical interpolation,
    wherein x is greater than y when the first dimension exceeds the predetermined threshold and the second dimension does not exceed the predetermined threshold, and wherein x is less than y when the first dimension does not exceed the predetermined threshold and the second dimension exceeds the predetermined threshold.

6. The device of claim 1, wherein the fetching device is configured to obtain the predetermined threshold from a decoded data stream.

7. The device of claim 1, wherein the fetching device is configured to:
    use a block size of the current block to select the interpolation filter with one of the first length or the second length for the current block.

8. The device of claim 1, wherein the fetching device is configured to:
    calculate a reference block size from a block size of the current block based on a scaling factor; and
    use the reference block size to select the interpolation filter with one of the first length or the second length.

9. A method, comprising:
    comparing a first dimension of a current block to a predetermined threshold;
    selecting a first length for an interpolation filter when the first dimension exceeds the predetermined threshold;
    selecting a second length for the interpolation filter when the first dimension does not exceed the predetermined threshold;
    applying the interpolation filter with one of the first length or the second length to the current block;
    producing an encoded data stream with the applied interpolation filter;
    using a block size of an overlapped block interposed between a neighboring block and the current block to select another interpolation filter with one of the first length or the second length for the overlapped block; and when the neighboring block uses a long interpolation filter and a short interpolation filter is selected for the overlapped block, mapping the long interpolation filter to the short interpolation filter of a selected type, wherein the interpolation filter with the first length corresponds to the long interpolation filter and the interpolation filter with the second length corresponds to the short interpolation filter.

10. The method of claim 9, further comprising:

calculating a reference block size from a block size of the current block based on a scaling factor; and using the reference block size to select the interpolation filter with one of the first length or the second length.

11. The method of claim 9, wherein the interpolation filter with one of the first length or the second length is applied along a first axis that corresponds to the first dimension.

12. The method of claim 11, further comprising:

comparing a second dimension of the current block to the predetermined threshold;

selecting the first length for the interpolation filter when the second dimension exceeds the predetermined threshold; and selecting the second length for the interpolation filter when the second dimension does not exceed the predetermined threshold.

13. The method of claim 12, further comprising:

applying the interpolation filter with one of the first length or the second length along a second axis orthogonal to the first axis that corresponds to the second dimension.

14. The method of claim 13, further comprising:

encoding the current block using an x-tap filter for horizontal interpolation and a y-tap filter for vertical interpolation, wherein x is greater than y when the first dimension exceeds the predetermined threshold and the second dimension does not exceed the predetermined threshold, and wherein x is less than y when the first dimension does not exceed the predetermined threshold and the second dimension exceeds the predetermined threshold.

15. The method of claim 9, further comprising obtaining the predetermined threshold from a decoded data stream.

16. The method of claim 9, further comprising:

using a block size of the current block to select the interpolation filter with one of the first length or the second length for the current block.

* * * * *